United States Patent [19]

Proffer

[11] 4,283,917
[45] Aug. 18, 1981

[54] EVAPORATIVE CHARGE FORMING SYSTEM INCORPORATING AIR COOLING MEANS

[76] Inventor: Charles L. Proffer, P.O. Box 206, Gulfport, Miss. 39501

[21] Appl. No.: 105,715

[22] Filed: Dec. 20, 1979

[51] Int. Cl.³ ............................................ F25B 19/00
[52] U.S. Cl. .......................................... 62/7; 62/307; 62/310; 261/56; 261/122; 261/130; 261/151
[58] Field of Search ...................... 62/7, 310, 307, 308; 261/122, 130, 151, 47; 123/134, 198 DB, 198 D; 137/433; 126/113

[56] References Cited

U.S. PATENT DOCUMENTS

| | | | |
|---|---|---|---|
| 2,157,409 | 5/1939 | Helfrecht | 62/308 X |
| 2,259,950 | 10/1941 | Downs | 62/7 |
| 2,565,767 | 8/1951 | Gaskell, Jr. | 62/308 X |
| 2,579,512 | 12/1951 | Perrine | 62/7 |
| 2,780,078 | 2/1957 | Teplitz | 62/310 |
| 2,908,143 | 10/1959 | Price | 62/7 |
| 3,713,429 | 1/1973 | Dwyre | 123/134 X |
| 3,776,215 | 12/1973 | Howard et al. | 126/113 |
| 4,031,874 | 6/1977 | Alwine | 123/134 |
| 4,131,129 | 12/1978 | Firestone | 137/596.12 |

*Primary Examiner*—William E. Tapolcai, Jr.
*Attorney, Agent, or Firm*—Harvey B. Jacobson

[57] ABSTRACT

A closed chamber is provided for containing evaporative liquid fuel for a combustion engine and fuel supply structure is operatively associated with the chamber for maintaining a predetermined general level of liquid fuel in the chamber. The chamber includes engine induction air inlet structure opening thereinto below the aforementioned liquid level and a vaporized fuel and air outlet opening outwardly of the chamber from a level above the predetermined liquid fuel level. Duct structure is provided including an inlet portion communicated with the vaporized fuel and air outlet and an outlet end for communication with the induction passags of a combustion engine. Further, an air conditioner evaporator-type heat exchanger is provided and liquid fuel conduit and pump structure is operatively associated with the chamber and heat exchanger for circulating fuel within the chamber through the heat exchanger. Also, both the air inlet and air and fuel outlet for the chamber include valve structure operative during periods of non-use of the associated combustion engine for closing the chamber inlet and outlet, a warning system is provided for indicating a drop of liquid level within the chamber below the aforementioned predetermined level and water sensing structure is provided for sensing a build up of water in the bottom of the chamber.

9 Claims, 8 Drawing Figures

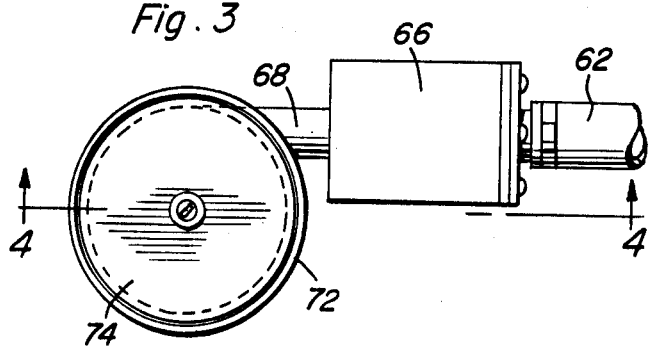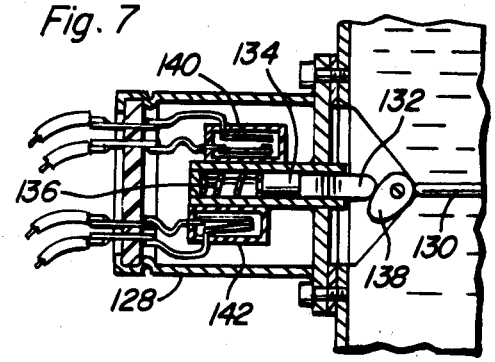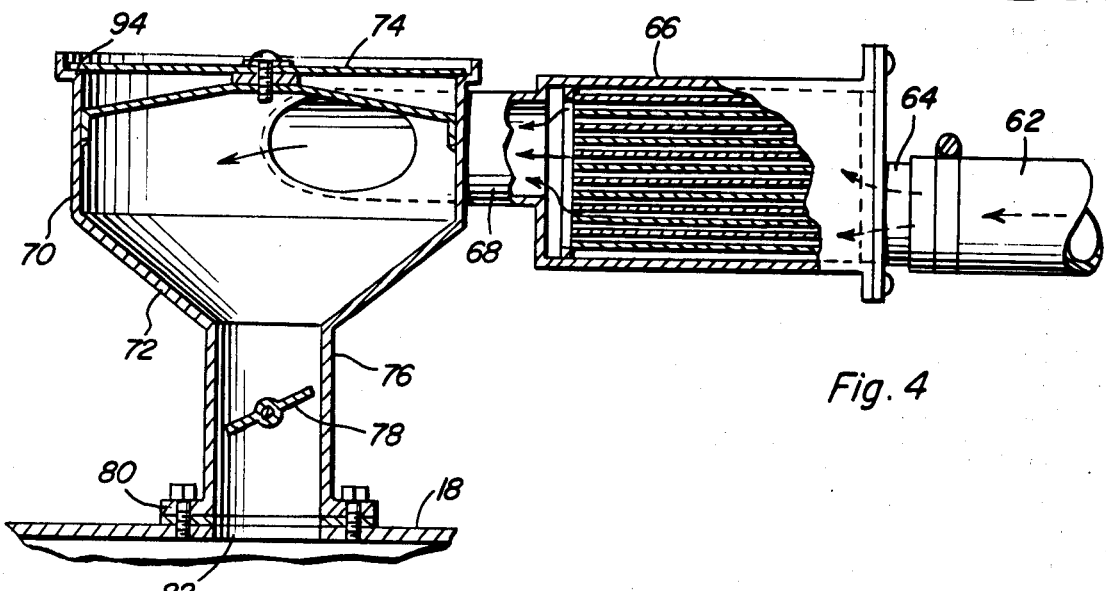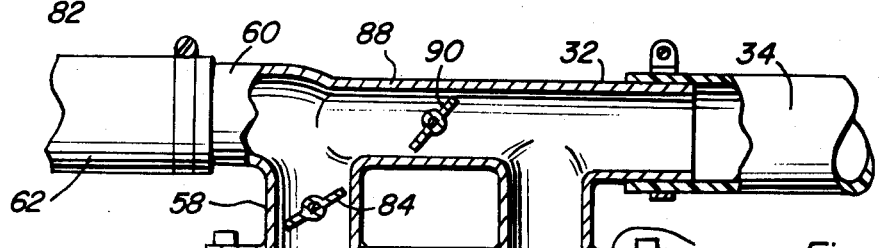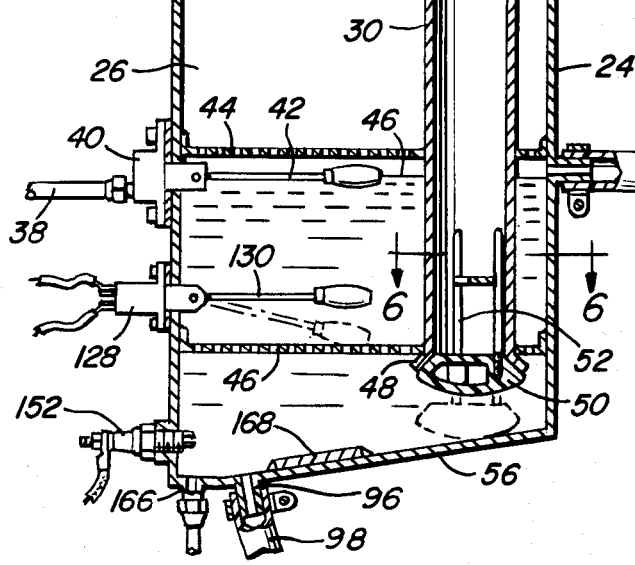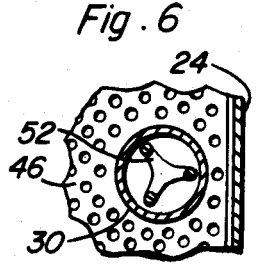

EVAPORATIVE CHARGE FORMING SYSTEM INCORPORATING AIR COOLING MEANS

BACKGROUND OF THE INVENTION

Various forms of fuel evaporative type charge forming devices have been heretofore been provided for use in conjunction with vehicles utilizing volatile fuels as engine fuels and a few attempts have also been made to utilize the heat absorbing properties of vaporizing fuel to provide means for adequately air conditioning the interior of an associated vehicle. However, most of these attempts have for one reason or another not proven as effective as they might.

Examples of previously known forms of combined fuel evaporation and refrigeration systems are disclosed in U.S. Pat. Nos. 2,872,790, 3,021,681, 3,306,056, 3,373,573 and 3,912,475.

BRIEF DESCRIPTION OF THE INVENTION

The evaporative charge forming system of the instant invention, which incorporates air cooling means, is constructed in a manner whereby an efficient fuel evaporative system is combined with an air cooling system utilizing the absorption of heat occurring as a result of the vaporization of a volatile fuel. The overall system includes unique safety features to prevent backfiring of an associated engine through the induction passages thereof as a result of an incorrect air and fuel mixture being supplied to the engine. In addition, structure is provided for varying the overall richness of the air and fuel mixture during varied climatic conditions. Structure is further provided to warn of a low condition of remaining fuel within the system and to enable excess water accumulated within the system to be drained therefrom.

The main object of this invention is to provide an efficient evaporative charge forming system.

Another object of this invention is to incorporate a fuel evaporation cooled refrigeration system in an efficient evaporative-type charge forming system.

A further object of this invention is to provide an evaporative charge forming system including safeguards against backfiring of the associated internal combustion engine.

Still another object of this invention is to provide an evaporative charge forming system including structure preventing fuel evaporation from the fuel evaporating chamber of the system during periods of non-use of the associated combustion engine.

A still further object of this invention is to provide a system in accordance with the preceding objects and including variably adjustable structure for rendering overall fuel air ratio adjustments to compensate for changing climatic conditions.

Another very important object of this invention is to provide a system capable of rendering a warning when a low fuel level exists.

Still another important object of this invention is to provide an evaporative charge forming system including passage structure for conveying a mixture of vaporized fuel and air to an associated combustion engine and with the passage structure including not only fire arresting structure serially connected therein but also an excess pressure relief valve downstream from the fire arresting structure.

A final object of this invention to be specifically enumerated herein is to provide an evaporative charge forming system in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a top plan view of the fire arrester and excess pressure relief valve portions of the system;

FIG. 4 is an enlarged fragmentary vertical sectional view taken substantially upon the plane indicated by section line 4—4 of FIG. 3;

FIG. 5 is a fragmentary enlarged transverse vertical sectional taken substantially upon a plane passing through the fuel evaporating chamber of the instant invention;

FIG. 6 is an enlarged fragmentary horizontal sectional view taken substantially upon the plane indicated by the section line 6—6 of FIG. 5;

FIG. 7 is an enlarged fragmentary vertical sectional view illustrating the float controlled switch mechanism for indicating a first low fuel supply warning and thereafter automatically terminating operation of the associated engine in response to a further drop of liquid fuel level.

DETAILED DESCRIPTION OF THE INVENTION

Figure 1:
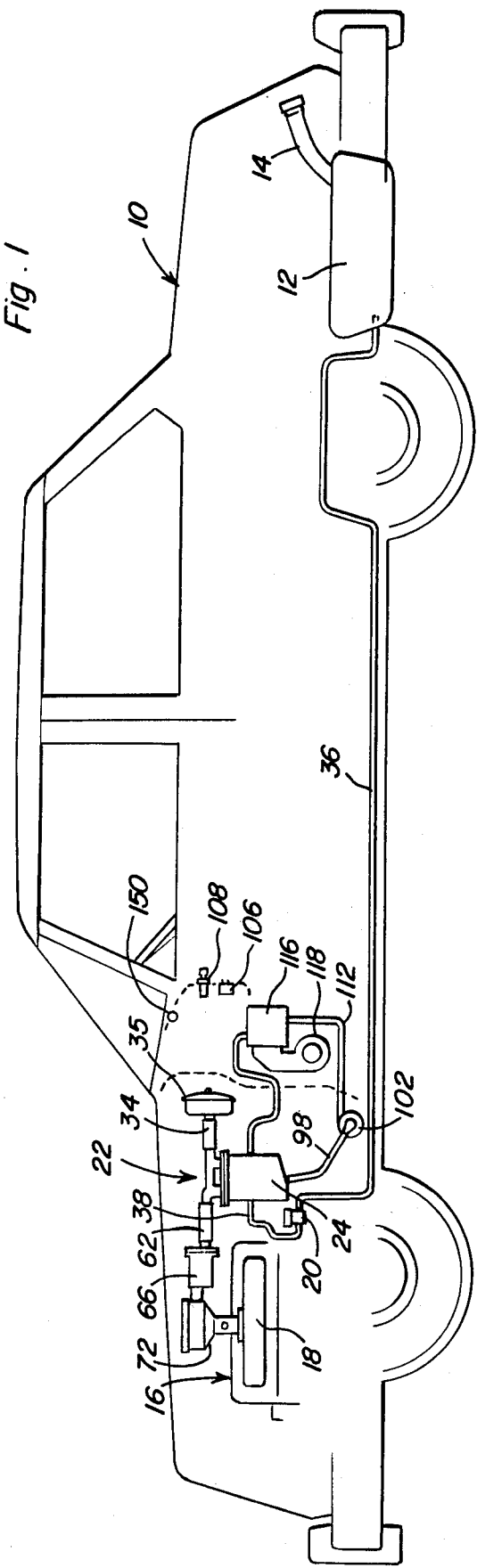
FIG. 1 is a schematic side elevational view of a motor vehicle incorporating the combined evaporative charge forming and air cooling system of the instant invention.

Referring now more specifically to the drawings, the numeral 10 generally designates a conventional form of motor vehicle including a rear gas tank 12 having a filler neck 14. The vehicle 10 further includes an internal combustion engine referred to in general by the reference numeral 16 including an intake manifold 18 and a fuel pump 20.

The evaporative charge forming system of the instant invention incorporating air cooling structure for the interior of the vehicle 10 is referred to in general by the reference numeral 22 and includes a thermally insulated housing 24 defining a closed chamber 26 therein. The housing 24 includes a removable top wall 28 downwardly through which an air inlet pipe 30 extends. The inlet pipe 30 includes a horizontal inlet end 32 to which a length of flexible conduit 34 is connected. The end of the conduit 34 remote from the inlet end 32 has a conventional air cleaner 35 operatively associated therewith.

The fuel pump 20 is operative to draw liquid fuel from the tank 12 through a fuel line 36 to the pump 20 and to pump the fuel from the fuel pump 20 through a line 38 to a float controlled inlet valve 40 opening into the chamber 26 and under the control of a float arm 42. The valve 40 and float arm 42 may be of conventional design.

The air inlet pipe 30 opens downwardly through a pair of vertically spaced upper and lower foraminated baffles 44 and 46 disposed horizontally in the chamber 26 and it will be noted from the FIG. 5 of the drawings that the valve and arm 42 are operative to maintain a predetermined level 46 of liquid fuel within the chamber 26.

The lower end of the air inlet pipe terminates in a downwardly flared lowered terminal end portion 48 with which a vertically reciprocal buoyant valve member 50 is operatively associated, the valve member 50 including upwardly projecting valve guiding structure 52 supported therefrom slidingly received in the lower end portion of the air inlet pipe 30. The upward limit of movement of the valve member 50 relative to the seat 48 is defined by engagement of the valve member 50 with the seat 48 and downward movement of the valve member 50 relative to the seat 48 is limited by contact of the valve member 50 with the inclined bottom wall portion 56 of the housing 24.

The housing 24 includes a thermally insulated outlet pipe 58 opening outwardly therefrom to the top wall 28 of the housing 24 and the outlet pipe 58 includes a horizontally directed outlet end portion 60 with which one end of a flexible insulated conduit 62 is connected. The other end of the flexible conduit 62 is coupled to the inlet fitting 64 of an insulated tubular flame arrestor 66 and the flame arrestor 66 includes an outlet fitting 68 opening generally tangentially into the upper generally cylindrical portion 70 of an insulated expansion chamber housing 72. The upper cylindrical portion 70 of the expansion chamber housing 72 is closed by a flexible and resilient pop-off disk 74 for relieving excess pressure within the housing 72 and the lower end of the housing 72 includes an outlet 76 equipped with a throttle valve 78 adapted at its lower end as at 80 for operative connection to the inlet port 82 of the intake manifold 18.

The outlet pipe 58 includes a butterfly valve 84 spring biased to a closed position and having an electric solenoid 86 electrically connected thereto for opening the butterfly valve 84 whenever the ignition circuit 86 for the engine 16 is closed. Further, the inlet end of the air inlet pipe 30 and the outlet end 60 of the outlet pipe 58 are communicated by a bypass duct 88 having an (may be manual or automatic) adjustable butterfly valve 90 disposed therein.

In operation, when the engine 16 is inoperative and the ignition circuit 86 is open, the valve member 50 is seated tightly against the seat 48 and the butterfly valve 84 is closed thereby preventing any evaporation of liquid fuel from within the housing 24. However, as soon as the ignition circuit is closed for starting the engine 16, the butterfly valve 84 is opened and when the starter of the engine 16 is engaged air is drawn downwardly through the air inlet pipe 30 and downwardly displaces the valve member 50 so that the intake air may be bubbled upwardly through the liquid fuel (gasoline, for example) within the chamber 26 to the level 46. As the air bubbles upwardly through the fuel, it is forced to pass through the foraminated baffles 46 and 44 and therefore evaporates considerable quantities of volatile fuel in order to form a charge of air and vaporized fuel for the engine 16. The charge exists from the housing 24 through the outlet pipe 58, passes through the flame arrestor 66 and through the chamber 72 down into the intake manifold under the control of the throttle valve 78. Should a backfire occur, the pop-off disk 74 will have its peripheral portions unseated from the annular seat 94 upon which the peripheral portions of the disk 74 rest and thus excess pressures within the housing 72 will be vented therefrom. In addition, the flame arrestor 66 will prevent any heat of such a backfire from passing upstream through the flame arrestor 66 and into the outlet pipe 58 and the upper portion of the chamber 26.

The valve 90 is variably (may be manual or automatic) adjusted according to reasonably large changes in temperature and humidity conditions and is therefore only occasionally adjusted to provide the desired amount of bypass of fresh air from the air cleaner 36 directly into the outlet pipe 58.

The lower end of the housing 24 includes a fuel circulating outlet 96 to which the inlet end of a hose 98 is connected and the hose 98 has its outlet end connected to the inlet 100 of a liquid pump 102 driven by an electric motor 104 under the control of a thermostat 106 connected in series with the ignition switch 108. The pump 102 includes an outlet 110 to which the inlet end of a hose 112 is connected and the outlet end of the hose 112 is connected to the inlet 114 of an air conditioner evaporator-type heat exchanger 116 through which air from the interior of the vehicle 10 may be circulated by a blower assembly 118 driven by an electric motor 120 also under the control of the thermostat 106. The heat exchanger 116 includes an outlet 122 to which the inlet end of a hose 124 is connected and the outlet end of the hose 124 is connected to the fuel circulating inlet fitting 126 opening into the chamber 26 below the baffle 44.

As intake air passes downwardly through the air inlet pipe and bubbles upwardly through the fuel within the chamber 26 below the level 46, the liquid fuel is chilled by evaporation. Thus, when the liquid fuel is circulated from the interior of the chamber 26 through the heat exchanger 116, the heat exchanger 116 may be utilized, under the control of the thermostat 106 to cool the air within the interior of vehicle 10.

The housing 24 additionally includes a float operated switch 128, see FIGS. 5 and 7, supported therefrom below the level 46 and including a switch actuating float arm 130 within the chamber 26 below the level 46. The arm 130 is operatively associated with a spring biased plunger 132 of the switch 128 and a magnet 134 disposed between the plunger 132 and the compression spring 136 for the plunger 132, the arm 130 including a cam 138 acting upon the plunger 132.

A pair of normally open and closed magnetic read switches 140 and 142 are electrically connected in a warning signal circuit 144 and the ignition circuit 86, respectively, and in the event the level 46 drops down to the level of the free end of the arm 130 in FIG. 5, the reed switch 140 will be closed actuating the visual and audible signal means 150 mounted within the vehicle to render an indication of low fuel level within the chamber 26. If the fuel level thereafter drops down toward a position with the free end of the arm 130 positioned as illustrated in phantom lines in FIG. 5, the opening of switch 142 will cause the ignition circuit 86 to be opened to terminate operation of the engine 16 and to thereby prevent operation of the engine 16 as the fuel supply is exhausted and reduce any possibility of the engine 16 backfiring through the air and fuel intake passages as a result of improper air and fuel mixture.

The housing 24 further include a water sensing probe 152 projecting into a lower portion of the chamber 126 and the probe 152 may be in the form of a conventional spark plug and electrically connected to a solid state operational amplifier 154 grounded as at 156, electrically connected to a suitable source of electrical potential as at 158 and also electrically connected to a solenoid controlled dump valve 160 as at 162. The dump valve 160 is serially connected in a drain line 164 controlling a drain outlet 166 from the bottom of the interior of the chamber 126. A mild steel plate 168 is affixed to the inclined portion 56 of the bottom of the housing 24 serving to provide iron oxide impurities to any condensed water which may accumulate in the bottom of the housing 24. Of course, the solenoid actuated valve 160 is spring biased to the closed position and is immediately again closed after opening thereof when the probe 152 can no longer sense an accumulation of water in the bottom of the chamber 26 to the level of the probe 152. Thus, probe 152 and valve 160 serve to intermediately drain the accumulation of condensed water from within the bottom of the chamber 26.

Figure 8:
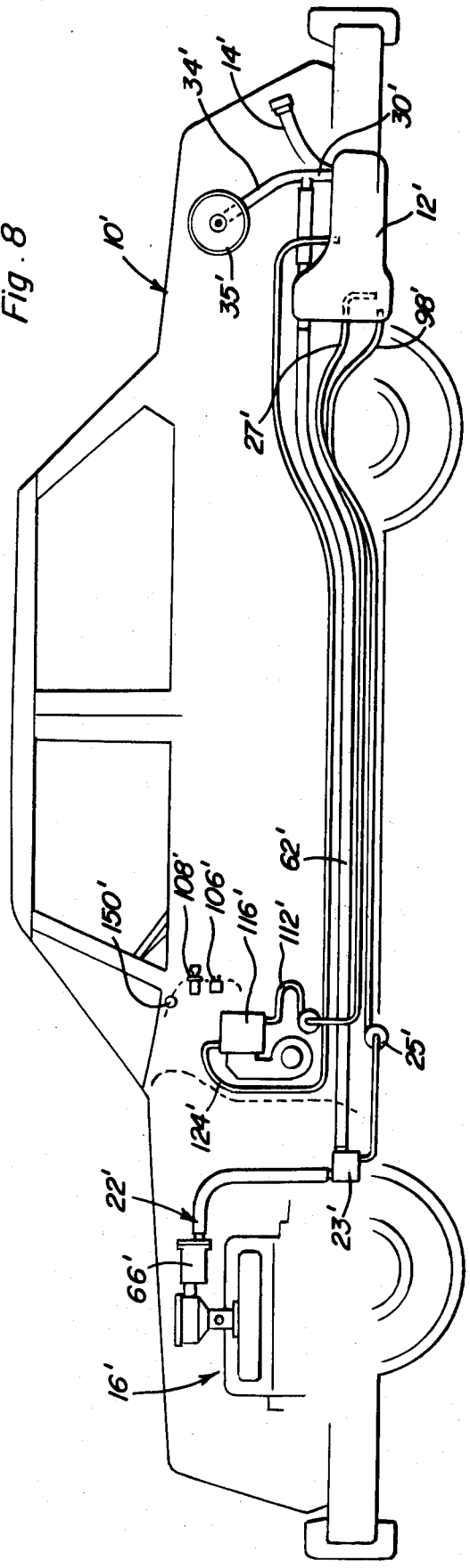
FIG. 8 is a schematic side elevational view similar to FIG. 1 but illustrating a modified form of the invention wherein a conventionally located main fuel tank of the vehicle is utilized as the volatile fuel evaporating chamber.
Figure 2:
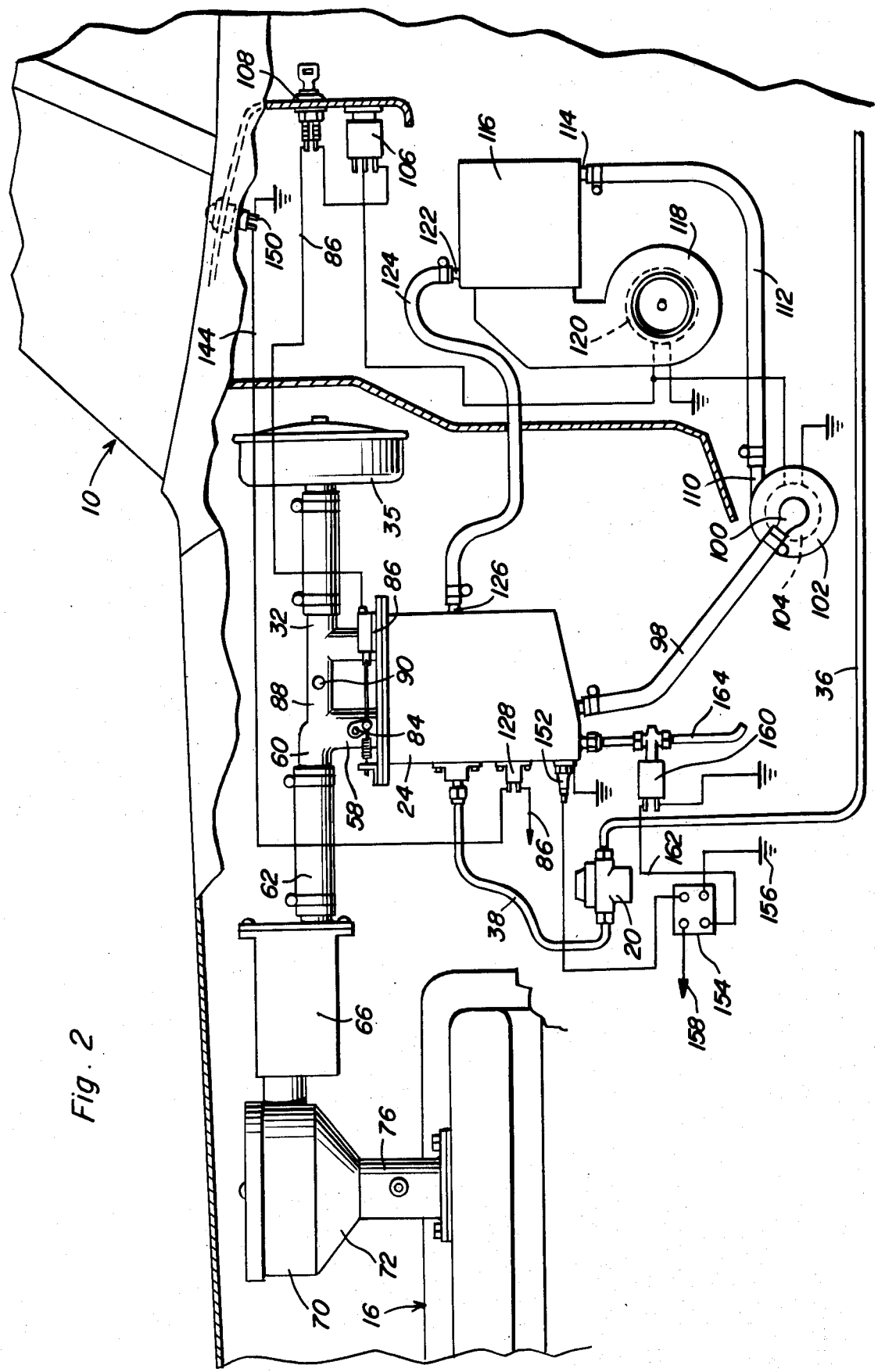
FIG. 2 is an enlarged fragmentary side elevational view of the forward portion of the vehicle illustrated in FIG. 1 and with portions of the vehicle being broken away and illustrated in vertical section to more clearly illustrate the system of the instant invention.

With attention now invited more specifically to FIG. 8 of the drawings, there will be seen a modified form of vehicle 10' in which a modified form of system 22' has been incorporated. The system 22' comprises a substantial duplicate of the system 22, except that the vehicle 10' includes a primary gas tank 12' which also functions as the housing 24. Accordingly, in addition to the tank 12' including an inlet neck 14' corresponding to the inlet neck 14, the tank 12' additionally includes an air inlet pipe 30' corresponding to the air inlet pipe 30 and having a conventional air cleaner 36' operatively associated therewith. In addition, various other components are of the system 22' and are designated by prime reference numerals corresponding to the reference numerals given the corresponding components of the system 22. However, the system 22' does include a sump chamber 23' for collection of any condensing liquids which are discharged from the conduit 62' and a return pump 25' for returning the condensate back to the tank 12' through a line 27'.

It is pointed that the interior volume of the chamber 26 above the liquid level 46 and including the air and fuel passages extending to the butterfly valve 78 will amount to at least 50% of the displacement of the engine 16. Also, the effected total cross sectional area of all of the openings formed through the baffle 44 and also all of the openings formed through the baffle 46 will be at least 125% of the total cross sectional area of the opening 82. Further, the drop in level of liquid within the chamber 26 from the level 46 thereof until the signal means 150 is actuated by the switch 140 will equal approximately 1.25 U.S. gallons of fuel, whereby an adequate warning prior to engine cutoff by the switch 142 subsequent to actuation of the visual and audible signal means 150 will be afforded. Further, the level of remaining fuel within chamber 26 at the time of the ignition cutoff will be well above the seating surfaces of valve member 50.

The system of the instant invention initially forms a rich but totally vaporized, air and fuel mixture for ducting through the outlet pipe 56, and this rich mixture is subsequently "leaned down" by mixing with fresh air passing through bypass duct 88. In this manner a totally vaporized air and fuel charge, of an adjusted air/fuel ratio, may be supplied to the manifold 18 resulting in very efficient engine operation and less exhaust pollutants.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A charge forming system including a closed chamber, an evaporative liquid fuel supply means for maintaining a predetermined general level of liquid fuel in said chamber, said chamber including an engine induction air inlet opening thereinto below said level and an induction air outlet opening outwardly of said chamber from a level above said liquid level, duct means including an inlet portion communicated with said outlet and an outlet end for communication with the induction passages of a combustion engine, water drain means opening outwardly from a lower portion of said chamber, electrically operated valve means operatively connected with said water drain means for controlling the flow of liquid through said water drain means, electrically actuated water sensing probe means in the lower portion of said chamber and electrically connected to said valve means for opening the latter in response to a collection of water in the lower portion of said chamber up to the level of said water sensing probe means, said electrically operated valve means being spring biased to the closed position and electrically operable to the open position.

2. The combination of claim 1 wherein said chamber includes a low horizontal foraminated baffle therein below which said engine induction air inlet opens into said chamber, a foraminated baffle disposed in said chamber above the first partition and slightly above said liquid fuel level.

3. The combination of claim 1 wherein said chamber includes a liquid outlet below said liquid level and a liquid inlet, conduit means connecting said liquid outlet to said liquid inlet exteriorly of said chamber, said conduit means including pump means serially connected therein and air conditioner evaporator-type heat exchanger means serially connected therein, said conduit means and pump means being operative to circulate liquid fuel from said chamber through said heat exchanger.

4. The combination of claim 1 wherein said duct means includes flame arrestor means serially connected therein and said duct means includes an expansion chamber serially connected therein provided with a excess pressure pop-off valve.

5. The combination of claim 1 including low fuel level sensing means operatively associated with said chamber for actuating audio-visual signal means response to a predetermined drop of fuel level in said chamber below said liquid level.

6. The combination of claim 1 wherein said engine induction air inlet opens downwardly within said chamber below said level of liquid fuel and defines a lower end downwardly opening seat, a buoyant valve member operatively supported from said induction air inlet and upwardly displaceable against said seat by the buoyant force of liquid fuel thereon responsive to termination of the inflow of induction air through said induction air inlet.

7. A charge forming system including a closed chamber, an evaporative liquid fuel supply means for maintaining a predetermined general level of liquid fuel in said chamber, said chamber including an engine induction air inlet opening thereinto below said level and an induction air outlet opening outwardly of said chamber from a level above said liquid level, duct means including an inlet portion communicated with said outlet and an outlet end for communication with the induction passages of a combustion engine, water drain means opening outwardly from a lower portion of said chamber, electrically operated valve means operatively connected with said water drain means for controlling the flow of liquid through said water drain means, electrically actuated water sensing probe means in the lower portion of said chamber and electrically connected to said valve means for opening the latter in response to a collection of water in the lower portion of said chamber up to the level of said water sensing probe means, said electrically operated valve means being spring biased to the closed position and electrically operable to the open position, low fuel level sensing means operatively associated with said chamber for actuating signal means responsive to a predetermined drop of fuel level in said chamber below said liquid level, ignition circuit interrupting switch means operatively associated with said low fuel level sensing means for interrupting an ignition circuit responsive to a further drop of fuel level in said chamber in excess of said predetermined drop.

8. A charge forming system including a closed chamber, an evaporative liquid fuel supply means for maintaining a predetermined general level of liquid fuel in said chamber, said chamber including an engine induction air inlet opening thereinto below said level and an induction air outlet opening outwardly of said chamber from a level above said liquid level, duct means including an inlet portion communicated with said outlet and an outlet end for communication with the induction passages of a combustion engine, said induction air inlet defining an elongated inlet duct including an inlet end and an outlet end, said outlet opening into said chamber below said lever, said inlet end having air cleaner means operatively associated therewith, said induction air outlet defining an outlet duct having an inlet end and an outlet end, said outlet duct inlet end opening into said chamber at a level above said liquid level, and an induction air by-pass duct communicating said inlet duct, between the inlet and outlet ends thereof, with said outlet duct between the inlet and outlet ends thereof, variable airflow controlling valve means operatively associated with said by-pass duct for controlling the flow of by-pass air therethrough, said engine induction air inlet opening downwardly within said chamber below said level of liquid fuel and defining a lower end downwardly opening seat, a buoyant valve member operatively supported from said induction air inlet and upwardly displaceable against said seat by the buoyant force of liquid fuel thereon responsive to termination of the inflow of induction air through said induction air inlet, outlet duct including gas flow valve means shiftable between full open and full closed positions, said gas flow valve means including an electrically controlled operator for closing said gas flow valve means responsive to an associated engine ignition circuit being opened.

9. A charge forming system including a closed chamber, an evaporative liquid fuel supply means for maintaining a predetermined general level of liquid fuel in said chamber, said chamber including an engine induction air inlet opening thereinto below said level and an induction air outlet opening outwardly of said chamber from a level above said liquid level, duct means including an inlet portion communicated with said outlet and an outlet end for communication with the induction passages of a combustion engine, water drain means opening outwardly from a lower portion of said chamber, electrically operated valve means operatively connected with said water drain means for controlling the flow of liquid through said water drain means, electrically actuated water sensing probe means in the lower portion of said chamber and electrically connected to said valve means for opening the latter in response to a collection of water in the lower portion of said chamber up to the level of said water sensing probe means.

* * * * *